United States Patent [19]
MacDonald

[11] 3,861,244
[45] Jan. 21, 1975

[54] TORQUE MULTIPLIER WRENCH

[76] Inventor: Warren Earl MacDonald, 40 Sunset Dr., Seekonk, Mass. 02771

[22] Filed: May 16, 1973

[21] Appl. No.: 360,814

[52] U.S. Cl. .................................. 74/805, 81/57.31
[51] Int. Cl. .......................... F16h 1/28, B25b 17/00
[58] Field of Search ............... 74/805, 804; 81/57.31

[56] References Cited
UNITED STATES PATENTS

| | | | |
|---|---|---|---|
| 306,375 | 10/1884 | Allen | 74/805 |
| 1,118,617 | 11/1914 | Apple | 74/805 |
| 1,133,784 | 3/1915 | Apple | 74/805 X |
| 1,320,460 | 11/1919 | Ellett | 74/805 |
| 2,450,692 | 10/1948 | Sacchini et al. | 74/805 X |
| 2,558,897 | 7/1951 | Akins | 81/57.31 |
| 2,845,821 | 8/1958 | De Noyers | 74/804 |
| 2,948,215 | 8/1960 | Tyma, Jr., et al. | 74/804 X |
| 3,192,799 | 7/1965 | Pamplin | 74/805 |
| 3,377,886 | 4/1968 | Frantz et al. | 74/805 |

Primary Examiner—Benjamin W. Wyche
Assistant Examiner—Lance W. Chandler
Attorney, Agent, or Firm—Burns, Doane, Swecker & Mathis

[57] ABSTRACT

A torque wrench having a high multiplication ratio comprising a casing having a reaction bar, a power output gear rotatably disposed in the housing and including internal gear teeth, a power input member having a drive arm eccentrically arranged with respect to the output gear, a pinion gear journaled on the drive arm and having external gear teeth facing the internal gear teeth, and a coupling element for controlling movement of the pinion. The coupling element is connected with the casing and with the pinion by means of axially projecting lug-and-slot connections which are arranged to guide the pinion in an orbital path of travel without rotation within the output gear, in response to rotation of the eccentric drive arm, whereby the pinion functions to cam the internal gear teeth of the output gear into rotational travel. The internal and external gears are designed such that the output torque is greater than the input torque.

8 Claims, 7 Drawing Figures

TORQUE MULTIPLIER WRENCH

BACKGROUND OF THE INVENTION

This invention relates to a hand tool for multiplying torque, and particularly concerns a torque wrench for transmitting an input torque into a higher output torque.

Hand wrenches for increasing mechanical leverage by multiplying an applied torque force have been heretofore known. Such wrenches find particular utility in certain bolt-tightening operations where a high degree of rotary force, or torque, is required. These wrenches may typically include a housing which rotatably carries input and output gears and at least one planetary-type pinion gear arranged in driving relationship therebetween. The pinion gear is arranged to mechanically convert an input torque from the input gear into a higher output torque on the output gear. Many of these torque wrenches have included at least three, and often four geared members, as may be observed for example in U.S. Pat. Nos. 2,092,598 and 2,634,630. The time and labor involved in the machining of geared elements dictates that considerable expense may be saved in reducing the number of geared elements in torque wrenches.

It is desirable for a torque multiplier wrench to provide high ratios of amplification. Previously patented planetary type wrenches allow ratios of only 3 or 4 to 1. A wrench having higher ratios, for example, as high as 20 to 1, would be useful in many applications where the previous torque wrenches could not be used.

Moreover, the planetary arrangement of pinion gears in torque wrenches of this type usually requires that relatively small diameter pinion gears be utilized to provide a wrench which is small enough to be easily manipulatable. The amount of stress which such gears can withstand before shearing, however, is a function of the size of the gear teeth. One way of increasing the size of the gear teeth is to increase the width of the gear, but in the planetary gear type torque wrenches previously known, an increase in the width of the gears would necessarily increase the size and weight of the wrench.

OBJECTS OF THE INVENTION

It is therefore an object of the present invention to provide a wrench which provides a high ratio of torque multiplication.

A further object of the invention is to provide a torque multiplier wrench which contains a minimum number of geared parts and which may be economically manufactured.

Another object of the invention is to provide a torque wrench which is compact in size, yet is capable of transmitting high torque loads.

SUMMARY OF THE INVENTION

These objects are accomplished by the present invention which comprises a torque wrench having a recessed casing and a reaction bar projecting from the casing. An output gear is rotatably mounted in the casing recess and includes a sleeve having a plurality of internal gear teeth. A power input member includes a drive arm eccentrically mounted within the sleeve. A pinion gear is journaled on the eccentric drive arm and includes external gear teeth which are fewer in number and have a smaller pitch diameter than the internal gear teeth. The amount of eccentricity of the drive arm is about one-half the difference between these pitch diameters. A coupling element is disposed in the casing for controlling the movement of the pinion gear and includes first and second axially projecting lug-and-slot connections with the casing and the pinion gear respectively. These lug-and-slot connections are offset by ninety-degrees and are responsive to the application of input torque to the input member to guide the pinion gear in an orbital path of travel, without rotation, within the sleeve and in driving contact with the output gear. In this fashion, the output torque applied by the output gear is greater than the input torque applied to the input member.

Relating more specifically to the preferred embodiment of the invention, the casing recess is downwardly opening and terminates in an apertured top wall. The output gear includes a circular sleeve having an upwardly opening bore in which the internal gears are disposed in a radially projecting and axially extending posture. An output stud projects downwardly from the sleeve. The drive arm of the input member comprises a cylindrical shaft which depends downwardly from an input stem, the latter extending through the apertured top wall and having a socket for the reception of a torque-applying tool. The stem, the casing recess, and the bore are co-axially arranged. The coupling element preferably comprises a ring having a central opening which is axially spaced from the pinion and receives the eccentric shaft.

Two pairs of oppositely facing, axially opening slots are carried by the coupling ring. One pair opens upwardly and defines a first reference line. The second pair is downwardly opening and defines a second reference line oriented at a right angle to the first reference line.

A pair of lugs project axially downwardly from the top wall into mating engagement with the upwardly opening slots. These lugs prevent rotation of the coupling ring but allow it to slide along the first reference line.

Another pair of lugs projects axially upwardly from the pinion gear into mating engagement with the downwardly opening slots. These lugs prevent rotation of the pinion gear but permit it to shift along the second reference line.

Consequently, the pinion can shift linearly relative to the coupling ring, in one direction, and the coupling ring and the pinion can shift as a unit relative to the casing in another direction. The combined effects of these shifting movements enable the pinion to travel in an orbital pattern within the sleeve.

Other facets of the invention involve the use of an O-ring to seal lubricant within the casing. In this connection, a snap ring is utilized to press an end plate against the O-ring to bias the O-ring into sealing engagement around the output gear.

DESCRIPTION OF THE DRAWINGS

In describing the invention, reference will be made to a preferred embodiment shown in the appended drawings.

In the drawings.

DESCRIPTION OF THE PREFERRED EMBODIMENT

Figure 1:
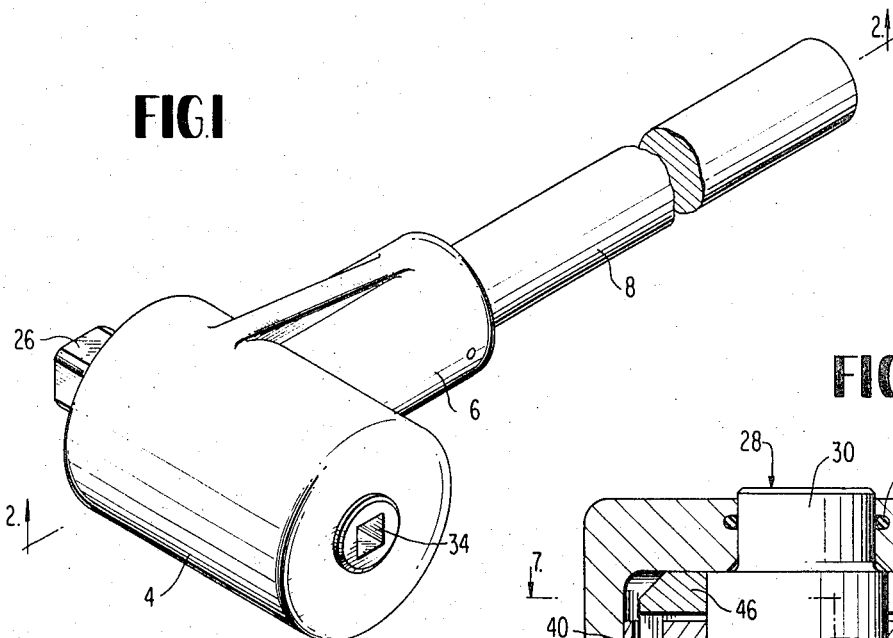
FIG. 1 is a perspective view of a torque wrench embodying the principles of this invention.

FIG. 1 depicts a torque wrench 2 employing the principles of the invention. The housing of the wrench includes a cylindrical casing 4 having an outwardly projecting socket 6 in which is fixedly secured a reaction bar 8.

Figure 2:
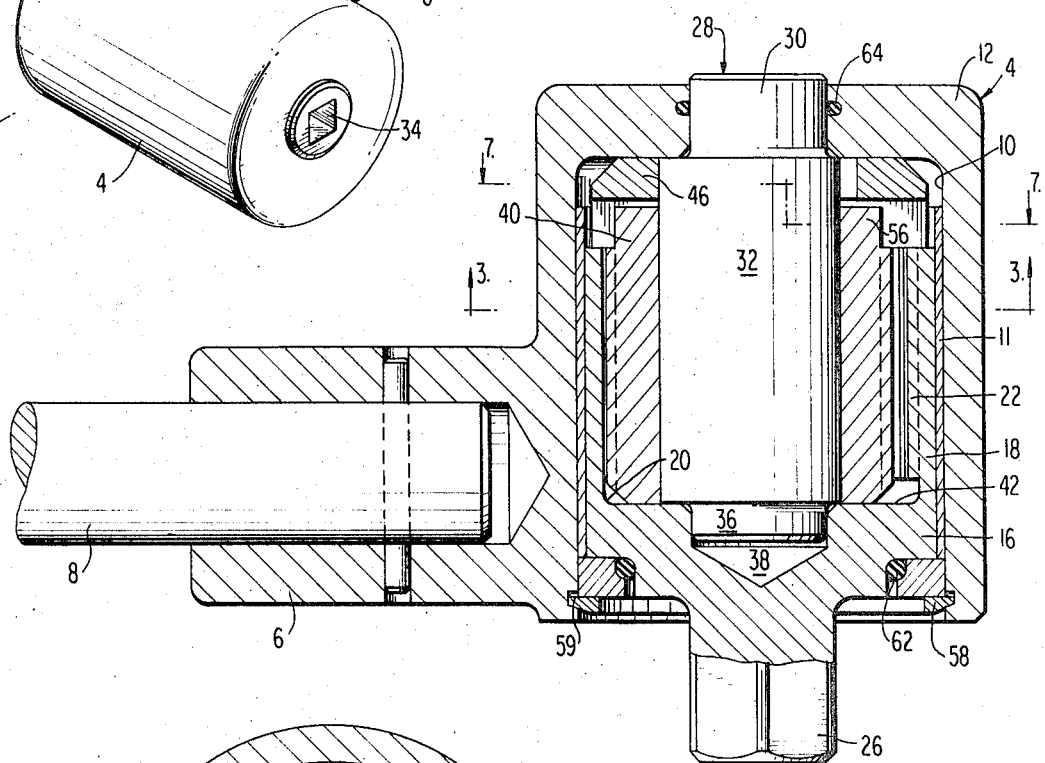
FIG. 2 is a sectional, side elevational view of the torque wrench taken along the line 2—2 of FIG. 1.
Figure 5:
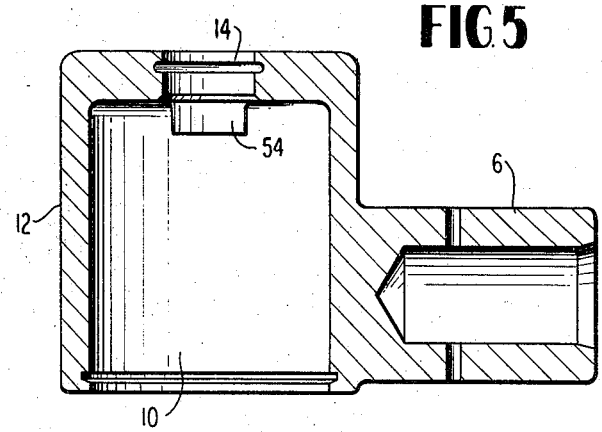
FIG. 5 is a sectional, side elevational view of the housing, taken along line 5—5 of FIG. 4.

The casing 4 is provided with a downwardly opening circular recess 10 which terminates in a top wall 12. Within the top wall there is an aperture 14 which communicates with the recess (FIGS. 2 and 5). A lining tube 11 is preferably installed within the recess 10.

Figure 3:
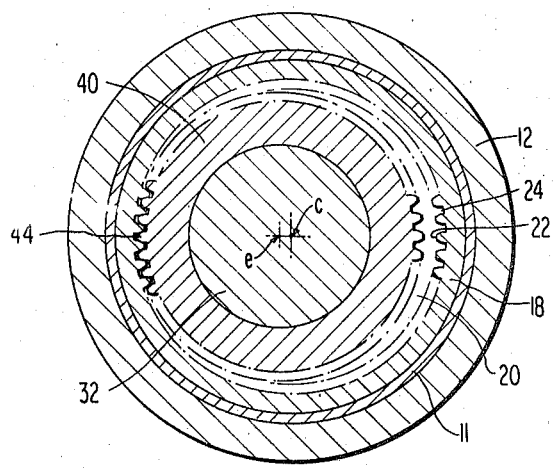
FIG. 3 is a sectional view taken along line 3—3 of FIG. 2.
Figure 4:
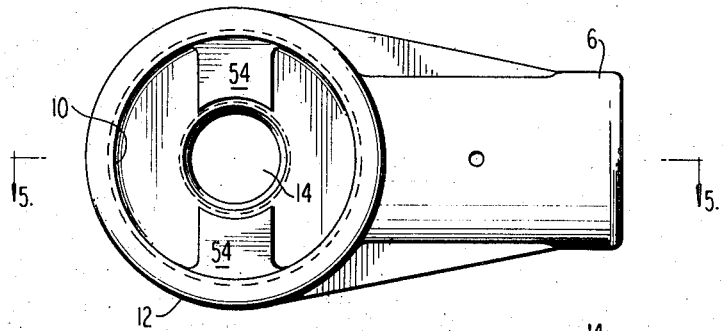
FIG. 4 is a bottom view of a housing portion of the torque wrench.

Within the recess 10 of the casing 12 there is rotatably mounted an output gear 16. The output gear 16 includes a sleeve portion 18 which is provided with a circular bore 20 (FIGS. 2 and 3). A set of internal gear teeth 22 project radially from the inner surface 24 of the bore 20 and extend axially along the bore. An output stud 26 is carried by the sleeve 18 and projects downwardly through the bottom of the recess 10. The stud is insertable within a conventional tool or socket element for transmitting torque thereto.

Also disposed within the casing 4 is a rotary input member 28 which includes a stem 30 and a drive arm in the form of a cylindrical shaft 32 carried by the stem. The stem extends through the aperture 14 in the casing and is socketed at 34 for receiving a conventional torque applying tool. The stem is arranged in the aperture for rotation co-axially with respect to the bore 20 of the sleeve 18.

The shaft 32 is arranged eccentrically relative to the stem 30 and is rotatably disposed within the bore 20, as may be viewed in FIGS. 2 and 3. Projecting downwardly from the stem 30 is a circular extension 36. This extension is aligned co-axially with respect to the stem, and is rotatably mounted within a guide cavity 38 of the sleeve output gear 16.

A hollow pinion gear 40 is positioned within the bore 20 between the input member and the output gear. The pinion gear is journalled on the eccentric shaft and is positioned within the bore 20 upon a step 42 situated in the sleeve 18. The pinion gear includes a set of external gear teeth 44 projecting radially from and extending axially along the outer surface of the pinion gear in facing relationship to the internal teeth 22. Preferably, the gears 22 and 44 have a large number of teeth in relation to the pitch diameter of the respective gears. Although the gear teeth 22 and 44 have a relatively short addendum and dedendum to accommodate the eccentric motion, the axial length of these gear teeth is relatively great. The large number of teeth and the great axial length of the gear teeth provide a large area of contact between the gear teeth. Therefore, the gears have a high load capacity.

The number of these external gear teeth 44 is less than the number of internal teeth 22. Moreover, the pitch diameter of the external gear teeth 44 is less than the pitch diameter of the internal gear teeth. The gear teeth are arranged such that one-half of the difference between the pitch diameters of the internal and external teeth is approximately equal to the amount by which the drive shaft 32 is eccentrically offset from the axis of the bore 20.

Figure 6:
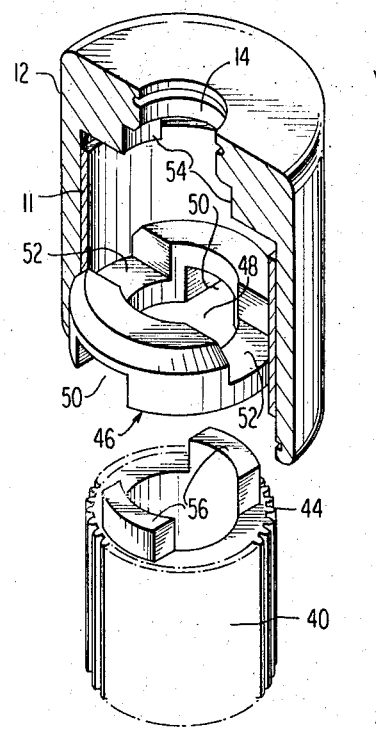
FIG. 6 is a partially sectioned exploded, perspective view of a portion of the torque wrench.

In order to control the movement of the pinion gear, i.e., resist rotation of the pinion gear about its own axis, the torque wrench includes a coupling ring 46 as may best be viewed in FIG. 6. The coupling ring is axially spaced from the internal gear teeth 44 and includes a central aperture 48 which receives i.e., accommodates passage of, the shaft 32. Arranged on the underside of the coupling ring is a pair of radially opposed downwardly opening slots 50. Arranged on the upperside of the ring is a pair of radially opposed, upwardly opening slots 52. The upwardly and downwardly opening slots 50 and 52 are offset by ninety degrees and are respectively aligned to define a pair of diametral reference lines which extend at right angles to each other.

Projecting axially downwardly from the top wall 12 of the casing 4 are a pair of lugs 54 which matingly enter the upwardly opening slots 52. With the lugs disposed within the slots 52, the coupling ring is restrained from rotating relative to the casing. The coupling ring is however, afforded a shifting movement relative to the casing along a reference line defined by the upwardly opening slots 52.

Projecting axially upwardly from the upper end of the pinion gear 40 is a pair of radially opposed lugs 56 which matingly enter the downwardly opening slots 50. With these lugs 56 being nested within the slots 50, relative rotation between the pinion gear 40 and the coupling ring 46 is prevented. Relative shifting movement therebetween is permitted, however, along the reference line defined by the downwardly opening slots 50.

Figure 7:
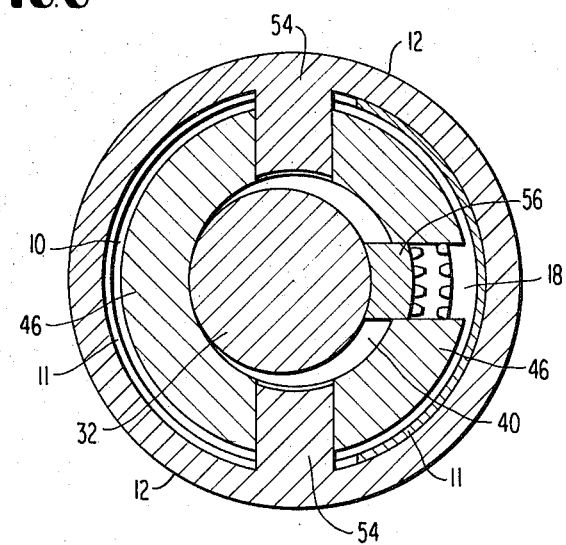
FIG. 7 is a sectional view taken along line 7—7 of FIG. 2.

It will be apparent that with the lugs 54 and 56 and the slots 52 and 50 being respectively nested together as shown in FIGS. 2 and 7, the pinion 40 is restrained from rotating about its own axis. The pinion is, however, able to shift relative to the coupling ring along the reference line defined by the slots 50 in response to an urging in this direction. It is also possible for the pinion 40 and the coupling ring 46 to shift as a unit relative to the casing along the reference line defined by the slots 52 in response to an urging in this direction. Simultaneous shifting of the pinion relative to the coupling ring and of the coupling ring relative to the casing will enable the pinion to travel in an orbital path, without rotation, within the sleeve.

In other words, as the shaft 32 is rotated by means of a torque, for example, a clockwise torque being applied to the stem 30, counterclockwise rotation of the pinion 40 is resisted by the above-described lug-and-slot connections. Consequently, the pinion is urged to travel in an orbital, or radially shifting pattern, without rotation, within the sleeve 18. This causes the sleeve to be rotated at a magnified torque as will be described subsequently in greater detail.

The wrench is maintained in its assembled condition by means of a snap ring 58 which fits into an annular slot 59 of the casing and holds an apertured end plate 60 and an O-ring seal 62 against the output gear 16. An O-ring seal 64 may be provided around the stem 30 and functions, in conjunction with the seal 62, to retain a lubricant, such as grease, with which the wrench is preferably packed at the time of assembly.

OPERATION

The torque wrench disclosed in accordance with the preferred embodiment of the invention may be employed in conjunction with a conventional wrench having a stud which mates with the socket 34. The stud 26 of the output gear 16 is simultaneously inserted into the socket of a tool or object to be turned. The reaction bar 8 is braced against a fixed object to resist rotation of the casing 4 when torque is applied to the shaft 30.

The operation of the torque wrench 2 will be initially discussed taking as an example the condition of the wrench wherein the center *e* of the eccentric shaft (traveling clockwise) becomes aligned with the center *c* of the bore 20 (FIG. 3) to define a line which is parallel with the reference line defined by the downwardly opening slots 50. In this condition, the pinion 40 will be urged radially, in a 9 o'clock direction, relative to the coupling ring 46, as shown in FIGS. 3 and 7, whereby the external teeth 44 are forced into camming engagement with the internal teeth 22. This shifting movement of the pinion is accommodated by the slots 50 which function to guide the sliding lugs 56.

As the external teeth cammingly engage the internal teeth, counter-rotation of the pinion, i.e., rotation in a direction opposite that of the shaft 32, is resisted by the lugs 54. Therefore, the internal teeth are cammed into clockwise rotation.

In the condition where the centers *e* and *c* are aligned in a direction which is offset 90° clockwise to that shown in FIG. 3, i.e., parallel to the reference line defined by the upwardly opening slots 52, the pinion is urged radially in a 12 o'clock direction by the shaft 32. This urging of the pinion is translated to the coupling ring 46 by means of the lugs 56 whereby the coupling ring 46 and the pinion 40, simultaneously as a unit, shift relative to the casing, with the lugs 54 serving to guide the sliding slots 52. In this posture the lugs 56 will be generally centered within their associated slots 50. As a result, the internal teeth will be cammed in a clockwise direction.

In all other positions of the shaft 32, i.e., where the centers *e* and *c* are aligned non-parallel with the previously described reference lines, the pinion will be radially urged into camming relation with the internal teeth 22. Such movement will be afforded by a simultaneous shifting of (1) the pinion relative to the coupling ring (within slots 50), and (2) the coupling ring and the pinion, as a unit, relative to the casing (along the lugs 54).

Therefore, starting with the 9 o'clock position of the shaft 32, the pinion 40 shifts relative to the coupling ring, with the coupling ring being centered on the lugs 5. In going from the 9 o'clock to the 12 o'clock position the pinion is gradually shifted to the right (i.e., in a 3 o'clock direction) relative to the coupling ring while the coupling ring (together with pinion which is carried thereby) simultaneously gradually shifts in a 12 o'clock direction relative to the casing. By the time that the shaft 32 reaches its 12 o'clock position, the pinion is centered within the slots 50 and the coupling ring (together with the pinion) is in its fully shifted posture in the 12 o'clock direction.

From this point, the pinion will shift in a 3 o'clock direction as the coupling ring shifts in a 6 o'clock direction until the 3 o'clock position of the shaft 32 is reached, and so on throughout the revolution of the drive shaft.

With every revolution of the eccentric shaft, the pinion will complete one orbital cycle, i.e., the center of the pinion will transcribe a circle. Since there are less gear teeth on the sleeve the sleeve will be rotated at less speed, but with greater torque, than the input gear element. Consequently, the output gear will apply a greater torque than is being applied to the input stem 30.

Therefore, for each complete rotation of the input element 28, the output element 26 is rotated by a fractional turn in the amount of the difference between the number of internal teeth on the sleeve 18, and the number of external teeth on the pinion 40, divided by the number of internal teeth on the sleeve 18. Hence, with a small difference between the numbers of teeth on the internal and external gears, and relatively numerous toothed gears, small fractional rotation is accomplished at consequently high torque multiplication.

Additionally, numerous gear teeth are simultaneously in progressive stages of contacting engagement. Therefore, the transmitted force is distributed over these numerous teeth.

The torque wrench described in accordance with this invention is especially advantageous in that a high ratio of torque multiplication is achieved with only a minimal number of parts. Specifically, only two geared parts are required, thereby simplifying the manufacture of components and the assembly of the wrench. Moreover, the utilization of a coupling arrangement which consists of axially projecting lug-and-slot connections provides a compact, yet rugged, assembly which can transmit high torque loads.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A torque multiplier wrench comprising:
   a casing having a cylindrical recess and an aperture in said casing axially aligned with said recess;
   rotary output gear means having an axial bore defining a sleeve portion journalled by said casing recess for rotation, said sleeve portion having internal gear teeth, and an output power transmitting portion spaced axially from said sleeve portion;
   rotary input means including an input power transmitting portion journalled in said aperture, and a drive arm portion projecting from said input power transmitting portion and being arranged eccentrically within said sleeve; pinion gear means being journalled on said drive arm portion within said sleeve and including external gear teeth, said external gear teeth being fewer in number than said internal gear teeth, the pitch diameter of said external gear teeth being less than the pitch diameter of said internal gear teeth, and the eccentricity of said drive portion being approximately one-half the difference between said pitch diameters;
   a coupling ring interposed between said pinion gear means and said casing aperture for controlling movement of said pinion gear in response to rotation of said drive arm, said coupling ring and said casing including a first axially projecting lug-and-slot connection for resisting relative rotation between said coupling ring and said casing while permitting relative shifting movement therebetween in a first direction, said coupling ring and said pinion gear means including a second axially projecting lug-and-slot connection for resisting relative rotation between said coupling ring and said pinion gear means while permitting relative shifting movement therebetween in a second direction extending approximately at a right angle relative to said first direction, and said first and second axially projecting lug-and-slot connections being responsive to the application of an input torque to said input power transmitting portion, to guide said pinion gear means in an orbital path of travel, without rotation, and in driving contact with said internal gear teeth, wherein an output torque applied by said output gear means is greater than the input torque applied to said rotary input means.

2. A torque wrench according to claim 1 wherein said first lug-and-slot connection comprises at least one axially projecting lug carried by one of said casing and said coupling ring and extending into mating engagement with the other of said casing and said coupling ring; and said second axially projecting lug-and-slot connection comprises at least one axially projecting lug carried by one of said coupling ring and said pinion gear means and extending into mating engagement with an axially projecting slot carried by the other of said coupling ring and said pinion gear means.

3. A torque wrench according to claim 1 including a lining tube in said cylindrical recess between said output gear means and said casing, whereby said lining tube serves as a journal supporting said output gear means for rotation.

4. A torque wrench according to claim 2 wherein said first lug-and-slot connection comprises a pair of oppositely facing, axially projecting lugs carried by said casing on opposite sides of said aperture and extending into mating engagement with a pair of diametrical slots in one side of said coupling ring; and said second lug-and-slot connection comprises a pair of oppositely facing axially projecting lugs carried by said pinion gear means and extending into mating engagement with a pair of diametrical slots in the opposite side of said coupling ring; said slots and lugs of said first connection being offset by approximately ninety degrees relative to the lugs and slots of said second connection.

5. A torque wrench as defined in claim 4 including an O-ring bearing against an external surface of said sleeve portion; a retainer plate having a seating groove for receiving said O-ring; and a snap ring secured to said housing and engaging said end plate to bias said O-ring into sealing engagement with said sleeve portion.

6. A torque wrench according to claim 5 wherein said output power transmitting portion includes a stud integral with and projecting from said sleeve portion; and said input power transmitting portion includes a socket adapted to receive a torque-applying tool.

7. A torque wrench comprising:
a casing having a downwardly opening cylindrical recess, said recess terminating in a top wall, said top wall having a circular aperture axially aligned with said recess; a reaction bar projecting from said casing;
a rotary output gear including a cylindrical sleeve portion rotatably disposed in said recess, said sleeve having internal gear teeth extending axially therealong, and an output power transmitting stud carried by said sleeve and projecting downwardly from said recess;
a rotary input member comprising a stem journalled in said aperture in said top wall and including a socket adapted to receive a torque-applying tool, said stem being axially aligned with said sleeve and said stud, and a cylindrical shaft integral with said stem and the central axis of said shaft being eccentric with respect to the axis of rotation of said stem;
a pinion gear journalled on said eccentric shaft within said bore, said pinion gear having external gear teeth extending axially therealong in engagement with said internal gear teeth of said sleeve, said external gear teeth being fewer in number than the said internal gear teeth; the pitch diameter of said external gear teeth being less than the pitch diameter of said internal gear teeth, and the amount of eccentricity of said eccentric shaft being approximately one-half the difference between said pitch diameters;
a coupling ring for controlling the movement of said pinion gear in response to the application of torque to said input stem; said coupling ring being disposed between said pinion gear and said top wall and including a central aperture through which said cylindrical shaft extends, said ring having a pair of radially opposed, upwardly opening slots, and a pair of radially opposed, downwardly opening slots; said upwardly opening slots defining a first reference line extending at a right angle relative to a second reference line defined by said downwardly opening slots; said casing including a pair of radially opposed lugs projecting axially downwardly from said top wall into mating engagement with said upwardly opening slots in a manner resisting relative rotation between said casing and said coupling ring while permitting relative shifting movement of said coupling ring along said first reference line; said pinion gear including a pair of radially opposed lugs projecting axially upwardly from the upper end of said pinion gear into mating engagement with said downwardly opening slots in a manner resisting relative rotation between said pinion gear and said coupling ring, while permitting relative shifting movement of said pinion gear along said second reference line; said axially projecting lugs and slots being responsive to the application of input torque to said input stem, to guide said pinion gear in an orbital path of travel, without rotation, within said bore and in driving contact with said internal gear teeth, wherein the output torque applied by said output gear is greater than the input torque applied to said input stem.

8. A torque wrench according to claim 7 and further including a circular extension projecting from the lower end of said eccentric shaft, and co-axially relative to said input stem, into rotary engagement with a circular guide cavity formed in the bottom of said sleeve portion; an O-ring bearing against an external surface of said sleeve portion; a circular retainer plate disposed within said recess and having a seating groove receiving said O-ring; and a snap ring mounted at the lower end of said casing and including means engaging said end plate to bias said O-ring into sealing engagement with said sleeve portion.

* * * * *

UNITED STATES PATENT OFFICE
CERTIFICATE OF CORRECTION

Patent No. 3,861,244      Dated January 21, 1975

Inventor(s) Warren Earl Macdonald

It is certified that error appears in the above-identified patent and that said Letters Patent are hereby corrected as shown below:

The inventor's name was spelled incorrectly on the patent and is therefore not properly identifying the inventor. The name should read as follows:

Signed and sealed this 11th day of March 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,861,244      Dated January 21, 1975

Inventor(s) Warren Earl Macdonald

It is certified that error appears in the above-identified patent and that said Letters Patent are hereby corrected as shown below:

The inventor's name was spelled incorrectly on the patent and is therefore not properly identifying the inventor. The name should read as follows:

Warren Earl Macdonald

This certificate supersedes Certificate of Correction issued March 11, 1975.

Signed and sealed this 24th day of June 1975.

(SEAL)
Attest:

RUTH C. MASON
Attesting Officer

C. MARSHALL DANN
Commissioner of Patents
and Trademarks